(12) United States Patent
Holzlöhner et al.

(10) Patent No.: US 11,933,394 B2
(45) Date of Patent: Mar. 19, 2024

(54) DRIVE UNIT

(71) Applicant: ZF Friedrichshafen AG, Friedrichshafen (DE)

(72) Inventors: Andreas Holzlöhner, Langenargen (DE); Vyacheslav Brushkivskyy, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/851,342

(22) Filed: Jun. 28, 2022

(65) Prior Publication Data

US 2023/0022395 A1     Jan. 26, 2023

(30) Foreign Application Priority Data

Jul. 20, 2021   (DE) ..................... 10 2021 207 713.7

(51) Int. Cl.
| | |
|---|---|
| *F16H 57/00* | (2012.01) |
| *B60K 1/00* | (2006.01) |
| *F16H 57/04* | (2010.01) |
| *F16H 57/02* | (2012.01) |

(52) U.S. Cl.
CPC .......... *F16H 57/0476* (2013.01); *B60K 1/00* (2013.01); *B60K 2001/006* (2013.01); *F16H 2057/02034* (2013.01)

(58) Field of Classification Search
CPC ....... F16H 57/0476; F16H 2057/02034; F16H 57/0423; F16H 57/043; F16H 57/0436; B60K 1/00; B60K 2001/006
See application file for complete search history.

(56) References Cited

U.S. PATENT DOCUMENTS

| | | |
|---|---|---|
| 7,884,511 B2 | 2/2011 | Mogi et al. |
| 8,678,784 B2 | 3/2014 | Atarashi et al. |
| 11,137,061 B2 | 10/2021 | Ishikawa et al. |

(Continued)

FOREIGN PATENT DOCUMENTS

| | | |
|---|---|---|
| DE | 44 10 984 | 2/1995 |
| DE | 103 06 896 | 8/2004 |

(Continued)

OTHER PUBLICATIONS

German Patent Office, Office Action issued in German Patent Application No. 10 2021 207 729.3 (dated Mar. 28, 2022).

(Continued)

*Primary Examiner* — Zakaria Elahmadi
(74) *Attorney, Agent, or Firm* — Finch & Maloney PLLC

(57) ABSTRACT

Disclosed is a drive unit (10) with a housing (12), an electric motor (14) arranged in the housing with a rotor shaft (26). At least two oil chambers (30) are arranged in the housing (12). In each case the oil chambers include an oil zone (38) and an air zone (40) with an oil capture pocket (46). The oil chambers are flow-connected to one another via an overflow channel (42). Axial end areas of the rotor shaft (26) project into the oil chambers (30), and the rotor shaft defines a connecting channel (34) which flow-connects the oil chambers (30) to one another. A transmission is coupled to one axial end area or the rotor shaft (26) and an impulse disk (32) is coupled to the opposite axial end area, where each axial end area conveys oil to the respective oil capture pocket (46).

13 Claims, 3 Drawing Sheets

(56) References Cited

U.S. PATENT DOCUMENTS

| | | |
|---|---|---|
| 2006/0219037 A1 | 10/2006 | Inose et al. |
| 2012/0312120 A1 | 12/2012 | Engelmann et al. |
| 2019/0128179 A1* | 5/2019 | Kiyokami ................ B60K 6/40 |
| 2019/0229582 A1* | 7/2019 | Ito ............................ B60K 1/00 |
| 2019/0249765 A1* | 8/2019 | Ito ............................ B60K 1/00 |
| 2019/0285168 A1* | 9/2019 | Ikeda .................. F16H 57/0436 |
| 2021/0376685 A1 | 12/2021 | Hacklberger et al. |

FOREIGN PATENT DOCUMENTS

| | | | |
|---|---|---|---|
| DE | 11 2004 000 653 | | 2/2006 |
| DE | 10 2009 018 786 | | 10/2009 |
| DE | 11 2010 003 517 | | 12/2012 |
| DE | 112010003517 T5 * | 12/2012 | ............... B60K 6/26 |
| DE | 11 2017 003 983 | | 5/2019 |
| DE | 11 2019 002 135 | | 1/2021 |
| DE | 10 2019 122 617 | | 2/2021 |
| EP | 2 504 608 | | 10/2012 |
| EP | 2 831 469 | | 2/2015 |
| JP | 2010-137829 | | 6/2010 |
| JP | 2010-142090 | | 6/2010 |
| WO | 2004/074704 | | 9/2004 |
| WO | 2007/013642 | | 2/2007 |
| WO | 2013/143809 | | 10/2013 |
| WO | 2020/001784 | | 1/2020 |

OTHER PUBLICATIONS

German Patent Office, Office Action issued in German Patent Application No. 10 2021 207 713.7 (dated Feb. 23, 2022).

German Patent Office, Office Action issued in German Patent Application No. 10 2021 207 731.5 (dated Mar. 17, 2022).

German Patent Office, Office Action issued in German Patent Application No. 10 2021 207 712.9 (dated Mar. 28, 2022).

United States Patent and Trademark Office, Office Action issued in U.S. Appl. No. 17/855,271 (dated Oct. 13, 2023).

* cited by examiner

DRIVE UNIT

RELATED APPLICATIONS

This application claims the benefit of and right of priority under 35 U.S.C. § 119 to German Patent Application no. 10 2021 207 713.7, filed Jul. 20, 2021, the contents of which are incorporated herein by reference in its entirety.

FIELD OF THE DISCLOSURE

The invention relates to a drive unit, in particular an electric drive for a vehicle, with a transmission.

BACKGROUND

Electric drive units with transmission stages integrated in the same housing are known from the prior art. These can be made with a wet-running or dry-running electric motor and are used in motor vehicles. To ensure reliable operation, the drive unit and the transmission stages have to be lubricated and cooled. For that purpose, oil from an oil reservoir is propelled through the drive unit with the help of a pump.

For this purpose, electric oil pumps are usually used, since these work regardless of the rotation speed of the electric motor, and so that the drive unit can be lubricated and cooled in any operating condition. The disadvantage of such drive units is that electric oil pumps are expensive, they increase the weight of the drive unit, and they also take up space.

SUMMARY

Accordingly, the purpose of the present invention is to provide a drive unit with integrated transmission stages, which can be operated without an additional oil pump.

This objective is achieved by a drive unit with a housing, an electric motor arranged therein which has a rotor shaft, at least two oil chambers arranged in the housing which comprise an oil zone and an air zone with an oil-capturing pocket and are flow-connected with one another by way of an overflow channel, wherein the rotor shaft projects with its axial end areas into the oil chambers and comprises a connecting channel that flow-connects the oil chambers to one another. At one axial end area of the rotor shaft is coupled a transmission and at the other axial end area is coupled an impulse disk. In this case the transmission and the impulse disk are designed so that they can deliver oil from the respective oil zone to the corresponding oil capture pocket and the oil capture pockets are each flow-connected by an inlet channel to an oil inlet which opens into the connecting channel so that oil can flow from the oil pockets by way of the inlet channels into the connecting channel. In that way there is no need for an additional, usually electric oil pump since oil is delivered by the impulse disk and the transmission via the inlet channels, through the drive unit to the bearings, the shaft-sealing rings and the gearwheels. Preferably the inlet channels open into an axial end area of the rotor shaft in the oil inlet. In that way a simple structure and uncomplicated assembly are achieved, since the oil inlet can be pushed into the connecting channel at one axial end of the rotor shaft, or coupled to it in a simple manner.

In an embodiment of the invention, the oil inlet is arranged on the side of the rotor shaft remote from the transmission. This also contributes toward a simple structure and uncomplicated assembly. On the side of the rotor shaft remote from the transmission, more fitting space is available for the oil inlet.

Preferably, in the assembled condition of the drive unit, when the rotor shaft is directed horizontally the oil capture pockets are at a higher vertical level than the oil inlet. In that way, in operating conditions when driving on level ground the oil collected in the oil capture pockets flows down from the oil capture pockets to the oil inlet.

Preferably, in the assembled condition of the drive unit and with an oblique orientation of the rotor shaft of up to 20° relative to a horizontal plane, the oil capture pockets are at a higher vertical level than the oil inlet. Thus, even while correspondingly driving uphill the oil collected in the oil capture pockets flows into the oil inlet.

In an embodiment the rotor shaft is accommodated rotatably on bearings in the housing, and the connecting channel has outlet openings in the area of the bearings and the transmission so that the oil flows over the bearings and the transmission into the oil chambers. In that way, only or preferentially those points of the drive unit are supplied with oil which must be actively lubricated.

Preferably, a partition wall is provided between the oil chambers, which wall comprises the overflow channel.

Advantageously, the transmission is in the form of a planetary transmission. In that way large torques can be transmitted by a compact structure.

In an example embodiment the inlet channels are formed by channels in the wall of the housing or by separate lines, in particular tubes or flexible pipes. If the inlet channels are integrated in the housing wall, then no further component is needed. In that case the housing is preferably a multi-component design so that the channels can be produced as simply as possible, for example by drilling or during the casting process. It is also conceivable, however, that the housing is a single-component design except for a cover, and the channels are integrated in the housing for example with the help of a generative production process. If the inlet channels are in the form of separate lines, this makes for a particularly simple structure.

BRIEF DESCRIPTION OF THE DRAWINGS

Further features and advantages of the invention emerge from the following description and from the attached drawings, to which reference is made and which show.

DETAILED DESCRIPTION

Figure 1:
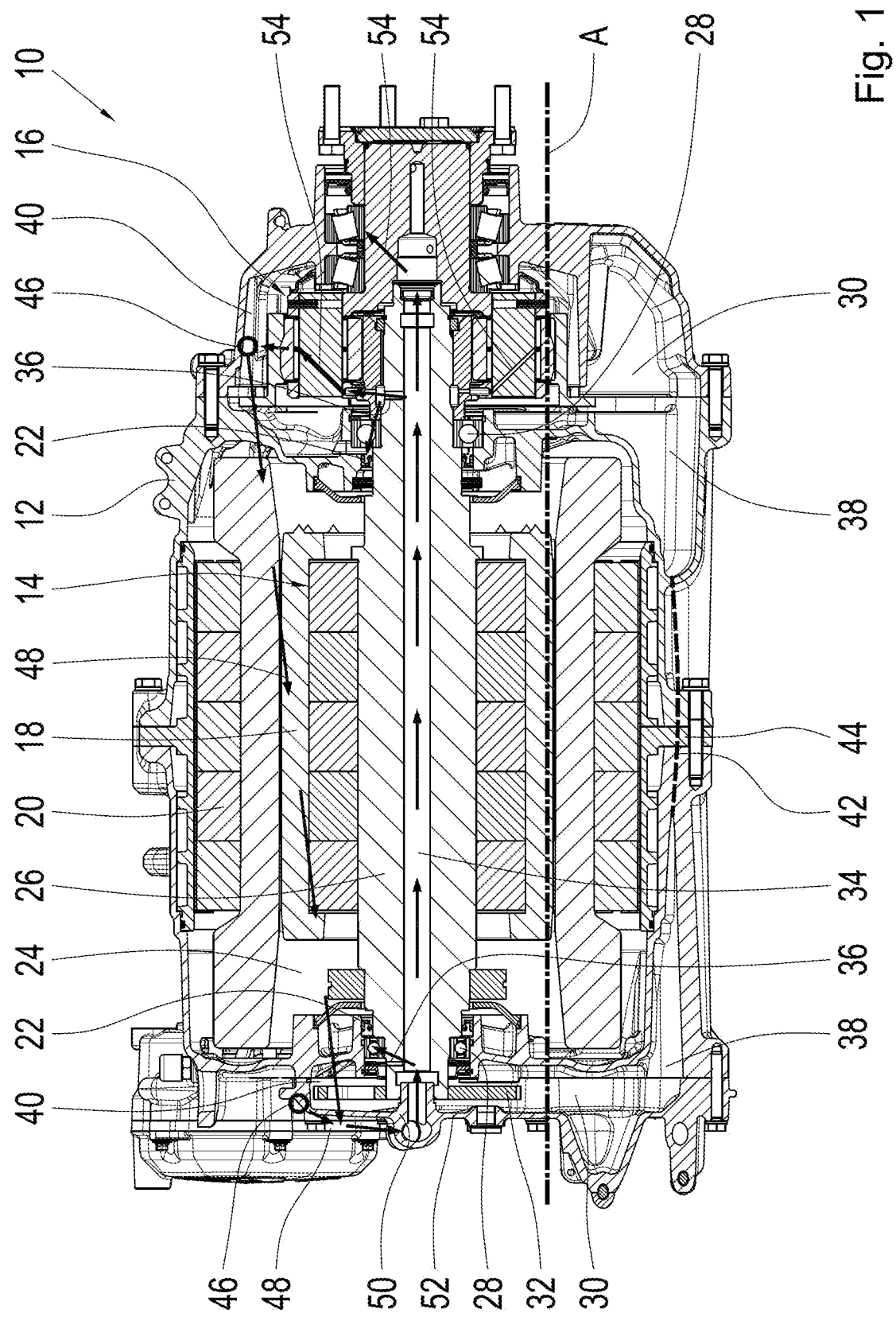
FIG. 1: A sectioned view of the drive unit according to the invention with the rotor shaft directed horizontally.

FIG. 1 shows a drive unit 10 with a housing 12 in which an electric motor 14 and a transmission 16 are arranged. The electric motor comprises a rotor 18 and a stator 20 and is arranged inside a separate dry space 24 sealed by shaft sealing rings 22.

The electric motor 14 can for example be an asynchronous motor.

In this case the transmission 16 is in the form of a planetary transmission. However, it is conceivable to use other type of electric motors and transmissions.

The rotor 18 is coupled to a rotor shaft 26 which, by means of bearings 28, in this embodiment in the form of ball bearings, is accommodated and can rotate in the housing 12.

The rotor shaft 26 is arranged in the housing 12 in such manner that it projects with its two axial end areas into oil chambers 30.

At one axial end area of the rotor shaft 26 is coupled the transmission 16 and at the other end area is coupled an impulse ring 32 for determining the rotation speed.

In this case the rotor shaft 26 is in the form of a hollow shaft and comprises a connecting channel 34.

The said connecting channel 34 has outlet openings 36 in the area of the bearings 28 and the transmission 16, and flow-connects the two oil chambers 30 arranged in the housing 12 to one another. Each oil chamber has an oil zone 38 and an air zone 40. In the figures, the oil level in the oil chambers 30 is indicated symbolically by the broken line A.

The oil chambers are arranged on axially opposite sides of the housing 12. Depending on the drive unit, more than two oil chambers 30 can also be provided in the drive unit 10.

In the oil zone 38 the oil chambers 30 are also flow-connected to one another by way of an overflow channel 42 formed in a partition wall 44, which channel is represented symbolically.

In the assembled condition the oil zones 38 are in a lower area of the oil chambers 30 and the air zones 40 are above them, in such manner that in the upper part of the air zones 40 in each case a schematically represented oil capture pocket 46 is formed in the housing 12. The oil capture pockets 46 can for example be simple protrusions in the wall of the housing 12, but more complex designs are also possible.

The oil capture pockets 46 are flow-connected via symbolically represented inlet channels 48 to an oil inlet 50. In this case the oil inlet 50 is formed in a cover 52 of the oil chamber 30 in which the impulse disk 32 is arranged and is optionally pushed with one end into the rotor shaft 26 so that the oil inlet is flow-connected to the connecting channel 34. However, the oil inlet 50 does not rotate with the rotor shaft 26.

Thus, the oil inlet 50 is attached at the axial end area of the rotor shaft 26 remote from the transmission 16.

The inlet channels 48 open into an upper area of the oil inlet 50. In the example embodiment illustrated, the inlet channel 48 coming from the transmission side first opens into the inlet channel 48 on the oil inlet side. It is also possible for both inlet channels 48 to open directly into the oil inlet 50, or for the inlet channel 48 on the oil inlet side to open first into the inlet channel 48 that extends from the transmission side.

Figure 2:
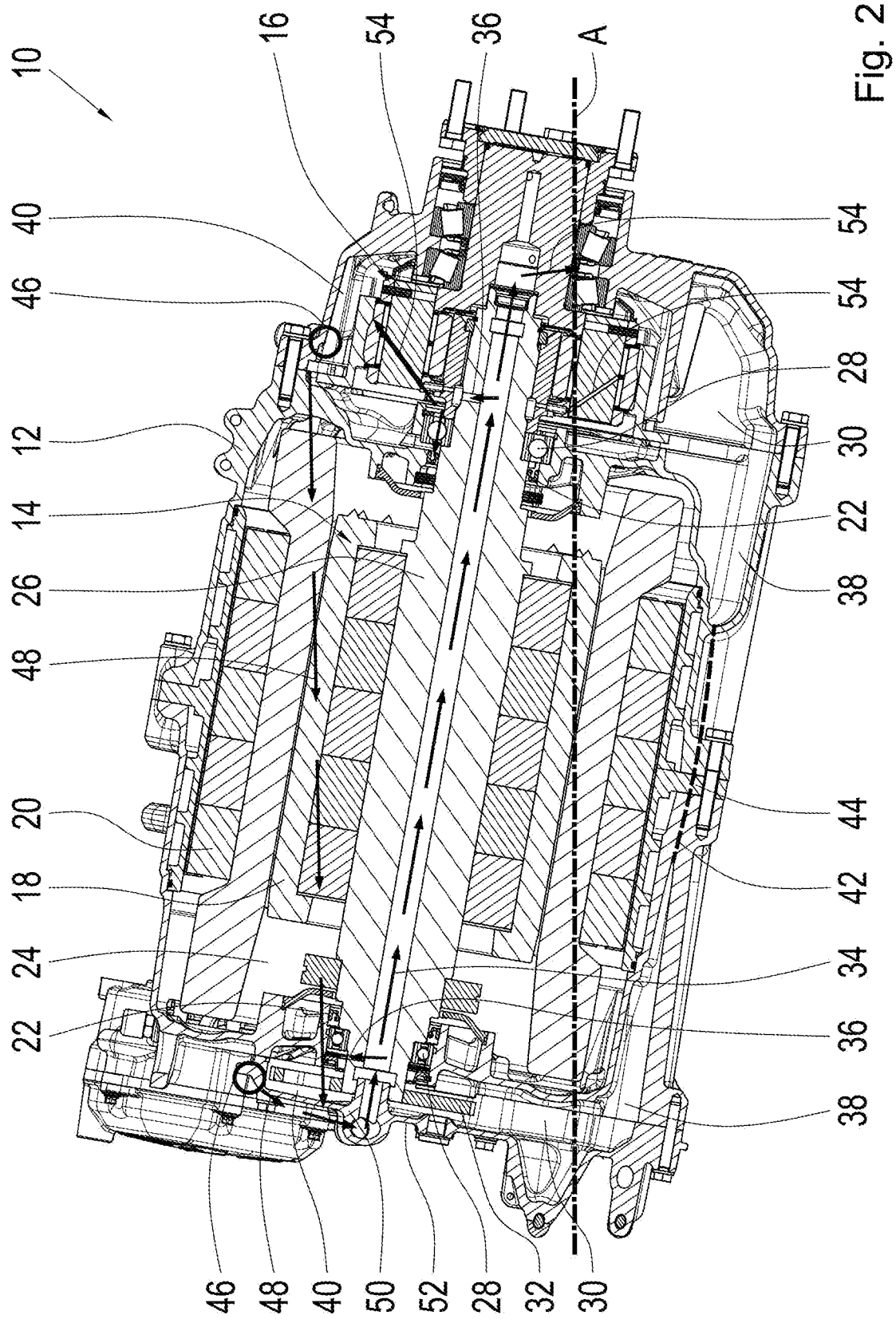
FIG. 2: A sectioned view of the drive unit according to the invention with the rotor shaft directed obliquely, for example for a fitted situation when driving uphill.
Figure 3:
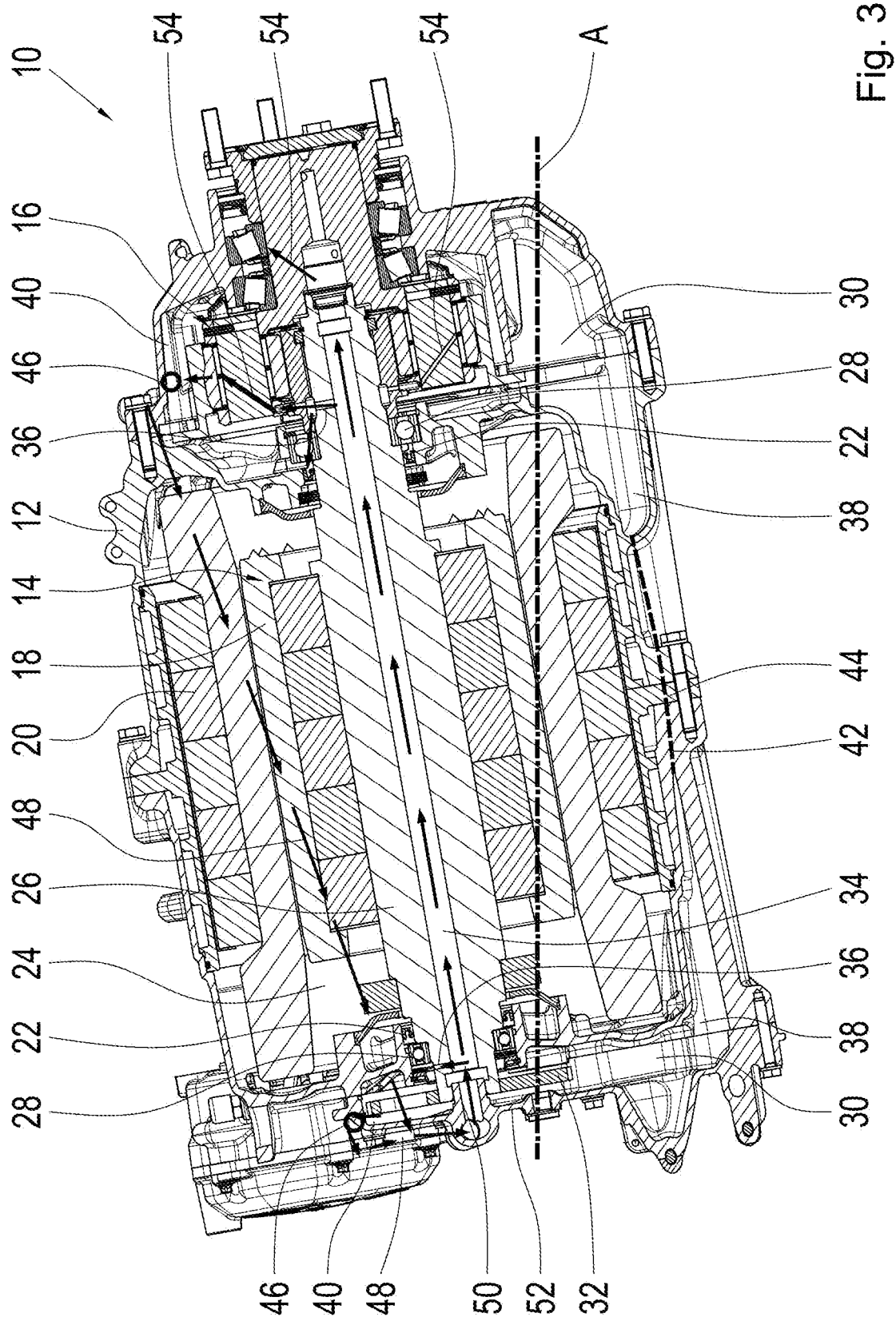
FIG. 3: A sectioned view of the drive unit according to the invention with the rotor shaft directed obliquely, for example for a fitted situation when driving downhill.

Furthermore, the oil capture pockets 46 are designed such that in all the usual driving situations they are at a higher vertical level than the oil inlet 50. More precisely, when the rotor shaft 26 is directed horizontally or when the rotor shaft 26 is in an oblique orientation range up to ±20° relative to a horizontal plane, the oil capture pockets are vertically above the oil inlet 50. In FIG. 1 that can be seen for travelling on level ground, in FIG. 2 for driving uphill and in FIG. 3 for driving downhill. In this context the terms uphill and downhill should be regarded as depending on the installation orientation of the drive unit 10 in the vehicle. If the installation orientation of the drive unit 10 in the vehicle was opposite to the installation orientations shown in FIGS. 1 to 3, then FIG. 2 would shown an installation situation for downhill driving and FIG. 3 one for uphill driving.

The inlet channels 48 extend from the oil capture pockets 46 obliquely downward to the oil inlet 50. The inlet ducts 48 can be formed in the wall of the housing 12, for example by drilling or by generative production, or in the case of separate lines such as tubes or flexible pipes they can extend inside or outside the housing 12. It is also conceivable for the tubes or pipes to extend partly inside and partly outside the housing 12.

The impulse disk 32 and the transmission 16, which during operation are driven by the rotor shaft 26, are designed such that by virtue of their rotation movement they deliver or spray oil from the corresponding oil zone 38 to the respective oil capture pocket 46.

In the example embodiment shown, the transmission 16 is for example so designed that when driving on level ground (see FIG. 1) and driving uphill (see FIG. 2) the transmission delivers oil to the corresponding oil capture pocket 46. In those conditions the impulse disk 32 does not deliver any oil, since it does not project down into the oil. Accordingly, the oil zone 38 arranged on the side of the transmission 16 in this case has the function of a primary oil reservoir. When driving downhill (see FIG. 3), the transmission 16 no longer projects down into the oil. So, in that case the impulse disk 32, which in this operating condition does project down into the oil, delivers oil to the corresponding oil capture pocket 46. For this, other designs also are conceivable, for example such that when the rotor shaft 26 is horizontal both the transmission 16 and the impulse disk 32 deliver oil, or only the impulse disk 32 delivers oil.

The oil collected in the oil capture pockets 46 flows through the inlet channels 48 extending obliquely downward into the oil inlet 50. From the oil inlet 50 the oil flows on into the connecting channel 34. By way of a first outlet opening 36 the oil here reaches the first bearing 28 and the first shaft sealing ring 22, and then flows into the oil zone 38 of the corresponding oil chamber 30.

On the axially opposite side of the rotor shaft 26 a second outlet opening 36 is formed, through which the oil can flow to the second bearing 28 and the second shaft sealing ring 22.

During this, the oil is propelled by centrifugal force into the outlet openings 36. Moreover, the oil flows here through lubrication channels 54 in the transmission 16 to the needle bearings and gearwheels of the planetary transmission. In this case too, the oil again flows into the oil zone 38 of the corresponding oil chamber 30.

Accordingly, in all the usual driving situations oil is conveyed from an oil zone 38 to the points that have to be lubricated and cooled, either by the impulse disk 32 or by the transmission 16, and sometimes by both these components. From those points, more precisely the bearings 28, the shaft sealing rings 22 and the transmission 16, the oil flows back into the oil zone 38 of the corresponding oil chamber 30, so that an oil cycle is created. Thus, there is no need for a separate oil pump with a drive of its own, which would increase costs.

INDEXES

10 Drive unit
12 Housing
14 Electric motor
16 Transmission
18 Rotor
20 Stator
22 Shaft sealing ring
24 Dry space
26 Rotor shaft
28 Bearing
30 Oil chamber
32 Impulse disk
34 Connecting channel 36 Outlet opening
38 Oil zone
40 Air zone
42 Overflow channel
44 Partition wall
46 Oil capture pocket
48 Inlet channel
50 Oil inlet
52 Cover
54 Lubrication channel

The invention claimed is:

1. A drive unit for an electric vehicle, comprising:
a housing;
an electric motor arranged in the housing, the electric motor having a rotor shaft with a first end portion and a second end portion opposite the first end portion;
first and second oil chambers arranged in the housing, each of the first and second oil chambers comprising an oil zone and an air zone with an oil capture pocket; and
an overflow channel flow-connecting the oil zone of the first and second oil chambers;
wherein the first end portion projects into the first oil chamber, the second end portion projects into the second oil chamber, and the rotor shaft defines a connecting channel that flow-connects the first and second oil chambers;
wherein a transmission is coupled to the first end portion of the rotor shaft and an impulse disk is coupled to the second end portion of the rotor shaft; and
wherein the transmission and the impulse disk are configured to deliver oil from the respective oil zone to the corresponding oil capture pocket of the first and second oil chambers, and each oil capture pocket is flow-connected by an inlet channel to an oil inlet that opens into the connecting channel, so that oil can flow from each oil capture pocket via the inlet channels into the connecting channel.

2. The drive unit according to claim 1, wherein each inlet channel opens into the oil inlet at the respective first and second end portions of the rotor shaft.

3. The drive unit according to claim 1, wherein the oil inlet is adjacent the second end portion of the rotor shaft.

4. The drive unit according to claim 1, wherein in the assembled condition of the drive unit each oil capture pocket is positioned at a higher vertical level than the corresponding oil inlet.

5. The drive unit according to claim 1, wherein in the assembled condition of the drive unit each oil capture pocket is positioned at a higher vertical level than the corresponding oil inlet at oblique orientations of the rotor shaft of up to 20° relative to a horizontal plane.

6. The drive unit according to claim 1, wherein the rotor shaft is accommodated rotatably in the housing by means of bearings, and the connecting channel has outlet openings in an area of the bearings and the transmission, so that oil can flow by way of the bearings and the transmission into the first and second oil chambers.

7. The drive unit according to claim 1, further comprising a partition wall between the first and second oil chambers, the partition wall comprising the overflow channel.

8. The drive unit according to claim 1, wherein the transmission is in the form of a planetary transmission.

9. The drive unit according to claim 1, wherein the inlet channel comprises channels in a wall of the housing.

10. The drive unit according to claim 1, wherein the inlet channel is formed by separate lines.

11. The drive unit according to claim 10, wherein the inlet channel is formed by tubes.

12. The drive unit according to claim 10, wherein the inlet channel is formed by flexible pipes.

13. The drive unit according to claim 1, wherein the drive unit does not have a separate oil pump.

* * * * *